United States Patent [19]

Smith

[11] Patent Number: 5,063,963

[45] Date of Patent: Nov. 12, 1991

[54] ENGINE BLEED AIR SUPPLY SYSTEM

[75] Inventor: Alan W. Smith, Cincinnati, Ohio

[73] Assignee: General Electric Company, Cincinnati, Ohio

[21] Appl. No.: 565,007

[22] Filed: Aug. 9, 1990

[51] Int. Cl.$^5$ ................................................ F02C 6/08
[52] U.S. Cl. ..................................... 137/606; 60/39.07
[58] Field of Search ............... 60/39.07; 137/112, 606, 137/113, 599, 613

[56] References Cited

U.S. PATENT DOCUMENTS

| | | | |
|---|---|---|---|
| 3,446,425 | 5/1969 | Cleeves | 60/39.07 X |
| 4,425,930 | 1/1984 | Kruto | 137/599 X |
| 4,550,561 | 11/1985 | Coffinberry | 60/39.07 X |
| 4,744,384 | 5/1988 | Nakamura et al. | 137/113 X |

FOREIGN PATENT DOCUMENTS 992881 1/1983 U.S.S.R. ............................... 137/599

Primary Examiner—Stephen M. Hepperle
Attorney, Agent, or Firm—Bernard E. Shay; Jerome C. Squillaro

[57] ABSTRACT

The present invention is directed to bleed air systems which derive air from a compressor. In one embodiment of the present invention, a compressor including three bleed ports is connected in a predetermined manner to a bleed air output connector through three controllable shutoff valves and two check valves. More particularly, the bleed air port connected to the highest pressure compressor stage is connected to the output connector through all three of the shutoff valves. The bleed air port connected to the second highest pressure compressor stage is connected to the output connector through one of the check valves and the second and third shutoff valves. Finally, the bleed air port connected to the lowest pressure compressor stage is connected to the output connector through the second check valve and the third shutoff valve.

16 Claims, 2 Drawing Sheets

ENGINE BLEED AIR SUPPLY SYSTEM

The present invention is directed to a bleed air arrangement for use in gas turbine engines and, more particularly, to an arrangement of valves for selectively bleeding air from the compressor section of a gas turbine engine.

BACKGROUND OF THE INVENTION

The Bleed Air Supply System (BASS) on a gas turbine provides air from the compressor stages of the engine to the aircraft Environment Control System (ECS). The air is "bled" off from the compressor via bleed air ports or holes in the compressor housing. These bleed air ports are located over specific portions or stages of the compressor. Each compressor stage comprises a set of static vanes preceded by a set of rotating vanes which force air through the compressor. Each stage of the compressor is normally smaller than the preceding stage, thus, the pressure of the air increases as it passes from one stage to the next. However, the actual pressure of the air in any given stage is a function of many variables including, for example, the speed that the compressor core is rotating and the air pressure at the compressor intake.

Therefore, the pressure of air bled from one bleed port may change substantially as engine operating conditions change. Thus, if it is desirable to obtain bleed air having a relatively constant pressure, it is necessary to place bleed air ports at more than one location in the compressor and to use external valves to select between bleed ports.

The BASS system on an aircraft engine normally takes bleed air from two or three of the compressor stages and controls the pressure, temperature and flow of the air to the aircraft interface.

In FIG. 3, a known two port bleed air system is illustrated wherein controllable shutoff valve 304 controls the flow of bleed air from a first bleed port 310 in compressor 300 and check valve 324 controls the flow of bleed air from a second bleed port 320. Controllable valve 308 controls the flow of air to bleed air system output 318.

SUMMARY OF THE INVENTION

The present invention is directed to bleed air systems which derive air from a compressor. In one embodiment of the present invention, a compressor including three bleed ports is connected in a predetermined manner to a bleed air output connector through three controllable shutoff valves and two check valves. More particularly, the bleed air port connected to the highest pressure compressor stage is connected to the output connector through all three of the shutoff valves. The bleed air port connected to the second highest pressure compressor stage is connected to the output connector through one of the check valves and the second and third shutoff valves. Finally, the bleed air port connected to the lowest pressure compressor stage is connected to the output connector through the second check valve and the third shutoff valve.

In a further embodiment of the present invention, n bleed ports are connected to an output connector. In this embodiment, the first bleed port is connected to the highest pressure compressor stage and is connected to the output connector by n controllable shutoff valves. The nth bleed port is connected to the output connector through a check valve followed by (n−1) of the controllable shutoff valves.

A bleed flow system according to the present invention enhances the reliability of the system by reducing or eliminating flapping in the check valve.

BRIEF DESCRIPTION OF THE FIGURES

The novel feature of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION

Figure 1:
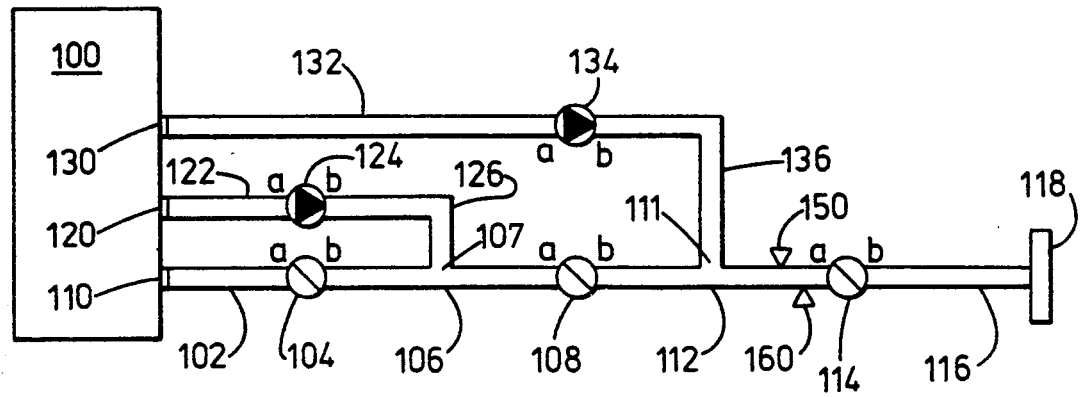
FIG. 1 illustrates one embodiment of the present invention wherein three bleed ports are connected to a single output connector.
Figure 3:
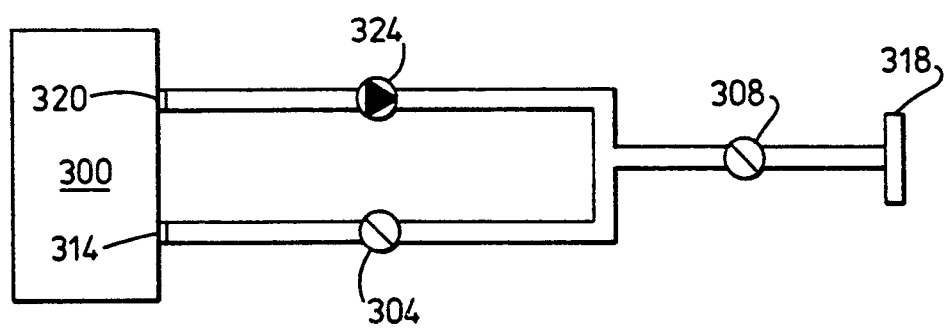
FIG. 3 illustrates a conventional two port bleed air system.

In FIG. 1, compressor 100 includes bleed ports 110, 120 and 130. Bleed port 110 may be connected to, for example, the 10th stage of compressor 100 to provide highly compressed air. Bleed port 120 may be connected to, for example, the 7th stage of compressor 100 to provide intermediate pressure air. Bleed port 130 may be connected to, for example, the fourth stage of compressor 100 to provide air at a lower pressure than the air provided at either bleed port 110 or bleed port 120. It will be recognized that the higher the pressure, the higher the temperature of the compressed air. Therefore, the temperature of the air at bleed port 110 will exceed the temperature of the air at bleed port 120 which exceeds the temperature of the air at bleed port 130.

The bleed ports themselves comprise small holes in the compressor casing at a particular compressor stage. A portion of the compressed air escapes or "bleeds" through the small hole and may be used, for example, to provide compressed air in the cabin of an aircraft or to aid in restarting an engine which has shut down by "bleeding air" from a functioning engine to the compressor of the stopped engine.

In FIG. 1, bleed port 110 is connected to input 104a of controlled shutoff valve 104 by bleed pipe 102. Shutoff valve 104 may be, for example, a co-axial two position valve. It may be, for example, pneumatically actuated and controlled by an electronic signal or controlled directly by an electrical signal which may be provided by the Engine's Electronic Control Unit (ECU). In the present embodiment, the shutoff valves may also be normally binary in operation. That is, they may be designed to be either on or off with no intermediate settings. The bleed pipes may be any pipe or tube material with sufficient strength to withstand the pressures generated by the compressor. The bleed pipes may also be referred to as high pressure bleed ducting. Bleed pipe 106 connects output 104b of valve 104 to the input 108a of controlled shutoff valve 108. Bleed pipe 112 connects output 108b to input 114a of controlled shutoff valve 114. The output 114b of controlled shutoff valve 114 is connected to bleed air system output connector 118 through bleed pipe 116.

FIG. 1 further illustrates the connection of bleed port 120 to input 124a of check valve 124 through bleed pipe 122. Check valve 124 may be, for example, a dual flapper type valve. Check valve 124 may also be referred to as a flutter valve. Check valves such as valve 124 are designed to operate such that, if the pressure at input 124a exceeds the pressure at output 124b, the check valve will open, allowing air to pass from the input to the output. If the pressure at output 124b exceeds the pressure at input 124a, then the check valve closes and remains closed until the pressure at input 124a exceeds the pressure at output 124b. A detrimental condition, known as fluttering, can occur when the pressure at input 124a is approximately equal to the pressure at output 124b. Fluttering may also occur where the pressure varies about the equilibrium point (i.e., the point at which the input and output pressures are equal). Fluttering is a term applied to the uncontrolled opening and closing of the check valve and is an undesirable operating condition since it results in excessive wear on the valve components.

In FIG. 1, the output 124b of check valve 124 is connected through bleed pipe 126 to bleed pipe 106 between controllable shutoff valves 104 and 108. Normally, the connection between bleed pipe 126 and bleed pipe 106 is made without any control or obstruction and may, for example, comprise a simple T-joint 107 which allows air to flow freely in any of three directions.

In FIG. 1, bleed port 130 is connected to input 134a of second check valve 134 by bleed pipe 132. The output 134b of check valve 134 is connected through bleed pipe 112 to bleed pipe 136 by, for example, unobstructed T-joint 111.

Thus, in operation, the embodiment illustrated in FIG. 1 is controlled by opening or closing controllable shutoff valves 104, 108 and 114. In operation, the pressure and temperature of the compressed air which is available at bleed ports 110, 120 and 130 will be a function of engine speed, and other variables, with the pressure and temperature increasing at all three ports as the compressor speed is increased.

The pressure of the air being passed to bleed air system output connector 118 is selected in accordance with aircraft or engine requirements. Air from the early stages of the compressor (e.g., stages 1-4) is lowest in pressure. Air from the later stages of the compressor (e.g., stages 10 or above) is highest in pressure. Intermediate pressure air may be derived from the intermediate stages (e.g., stages 5-9) of the compressor. As the compressor speeds up (e.g., for full power) it may be desirable to change the selected bleed port to maintain appropriate pressures.

In one illustrative embodiment of the present invention, bleed port 110 is connected to the tenth stage of high pressure compressor 100, bleed port 120 is connected to the seventh stage of compressor 100 and bleed port 130 is connected to the fourth stage of the compressor 100. The compressor may be a component of a gas turbine engine suitable for use in aircraft. In this illustrative embodiment, high pressure compressed air may be derived from the tenth compressor stage by opening controllable shutoff valves 104, 108 and 114, thus connecting bleed port 110 directly to bleed air system output connector 118. Bleed air system output connector 118 may be, for example, a connector adapted to connect the bleed air system to the internal bleed air system of an aircraft. Opening controllable shutoff valve 104 forces check valve 124 closed, since, the pressure of the tenth stage air is substantially greater than the pressure of the seventh stage air.

More particularly, when controllable shutoff valve 104 is opened, the air pressure at output 124b of check valve 124 will always exceed the pressure at input 124a of check valve 124 since the tenth stage air pressure at bleed port 110 will always exceed seventh stage pressure at bleed port 120. Thus, flutter is substantially eliminated in check valve 124. Further, with controllable shutoff valves 104, 108 and 114 open, the pressure of the tenth stage air at the output 134b of check valve 134 will exceed the pressure of the fourth stage air at the input 134a of check valve 134, thus forcing check valve 134 closed.

In the illustrative embodiment described above with respect to FIG. 1, seventh stage air may be routed from bleed port 120 to bleed air system output connector 118 by closing controllable shutoff valve 104 and opening controllable shutoff valves 108 and 114. In this arrangement, check valve 124 is open since the pressure from the seventh stage air exceeds the pressure from the fourth stage air from bleed port 120 and tenth stage air is prevented from reaching check valve 124 by controllable shutoff valve 104, which is closed. Thus, the air pressure at the input 124a of check valve 124 exceeds the air pressure at the output 124b of check valve 124, forcing check valve 124 open. With controllable shutoff valve 104 closed and controllable shutoff valves 108 and 114 open, the seventh stage air pressure at output 134b of check valve 134 will exceed the fourth stage air pressure at the input 134a of check valve 134, forcing check valve 134 shut.

Fourth stage air may be transmitted to bleed air system output connector 118 for the illustrative embodiment described previously with respect to FIG. 1, by closing controllable shutoff valves 104 and 108 while opening controllable shutoff valve 114. However, if shutoff valves 104 and 108 are closed, the air pressure at the input 124a of check valve 124 will be substantially equal to the air pressure at the output 124b of check valve 124. If the air pressure is substantially equal at input 124a and output 124b, the valve will tend to open and close randomly (e.g., as a result of mechanical vibration in the aircraft) resulting in "flutter". This fluttering causes undue wear and tear on the valve and may result in premature failure of valve components. In the present invention, undesirable flutter in check valve 124 may be avoided by opening or including controlled leakage through controllable shutoff valve 104, while keeping controllable shutoff valve 108 closed. With controllable shutoff valve 104 open and controllable shutoff valve 108 closed, the pressure of the tenth stage air at the output 124b of check valve 124 will exceed the pressure of the seventh stage air at the input 124a of check valve 124, thus ensuring that the valve remains closed and substantially eliminating the problems caused by flutter. Thus, when air (e.g., fourth stage air) is being transmitted from bleed port 130 to bleed air system output connector 118 by opening controllable shutoff valve 114, it is desirable to open controllable shutoff valve 104 while closing controllable shutoff valve 108. With controllable shutoff valve 108 closed and controllable shutoff valve 114 open, the pressure of the fourth stage air input 134a of check valve 134 will exceed the pressure at the output 134b and check valve 134 will open, allowing fourth stage air to flow from bleed port 130 to bleed air system output connector 118.

Further, according to the illustrative embodiment described with respect to FIG. 1, the air pressure at bleed air system output connector 118 may be eliminated or reduced by closing controllable shutoff valve 114. However, if controllable shutoff valves 104 and 108 are also shut, the resulting lack of a pressure differential across check valves 124 and 134 will result in flutter due to, for example, engine vibration. In order to prevent fluttering, controllable shutoff valves 104 and 108 may be left open, allowing tenth stage air to reach outputs 124b and 134b of check valves 124 and 134, thus creating a negative pressure differential across those valves to ensure that they remain closed.

It will be apparent that there may be times when it is undesirable to create a negative pressure differential across the check valves and that during brief intervals, the pressure differential across the check valves may drop to approximately zero resulting in some flutter. For example, if the bleed air system is to go from no air pressure at bleed air system output connector 118 (valves 104, and 108 open, valve 114 closed), to fourth stage air pressure, it is normally desirable to close valve 108 before opening valve 114 to ensure that tenth stage air does not reach bleed air system output connector 118. Thus, during the brief time period when controllable shutoff valves 108 and 114 are both closed, the pressure differential across check valve 134 will drop to approximately zero and the valve will tend to flutter due to, for example, mechanical vibration in the engine.

Figure 2:
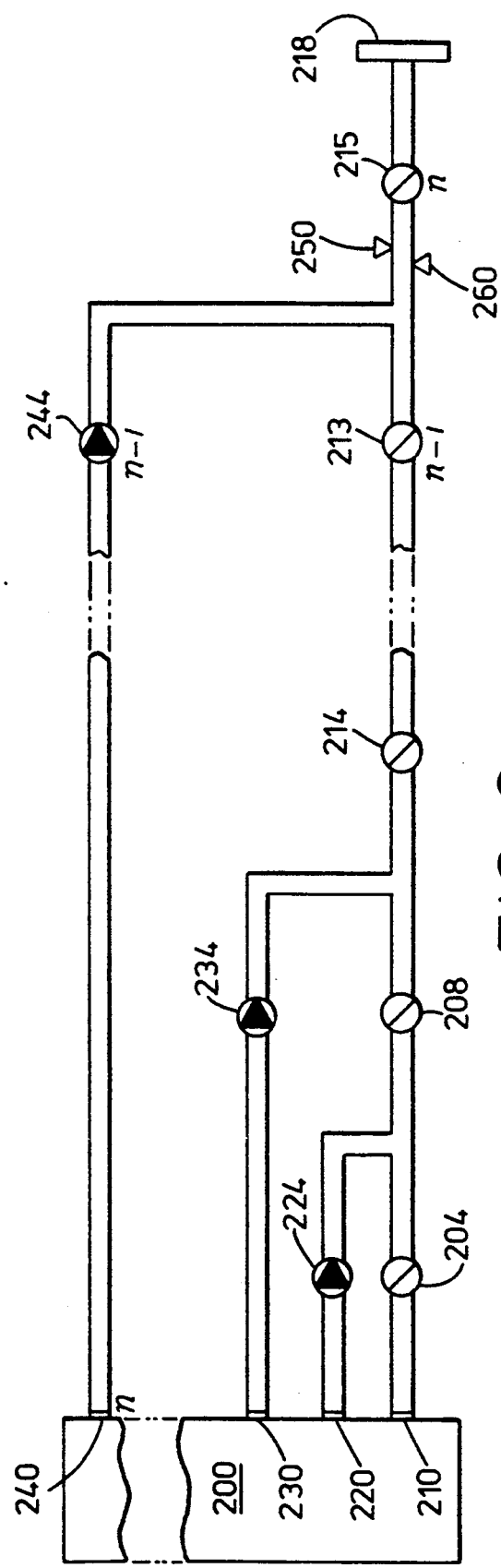
FIG. 2 illustrates a further embodiment of the present invention wherein n bleed ports are connected to a single output connector.

In a further embodiment of the present invention, illustrated in FIG. 2 multiple (e.g. n) additional bleed ports may be added to the system illustrated in FIG. 1 by hooking the $n^{th}$ bleed port through the $[n-1]^{th}$ check valve to a point between the $[n-1]^{th}$ and $n^{th}$ controllable shutoff valve. Thus, in order to access the $n^{th}$ bleed port, the $n^{th}$ controllable shutoff valve is opened, along with any controllable shutoff valves between the $n^{th}$ controllable shutoff valve and the bleed air system output connector (i.e., the $[n+1]^{th}$, $[n+2]^{th}$ ... ). In the preferred embodiment of the system, the $[n-1]^{th}$ controllable shutoff valve would be closed and remain closed as long as the $n^{th}$ bleed port was connected to the bleed air system output connector. In order to ensure that the nonselected check valves have a negative pressure differential (forcing them to remain closed), the controllable shutoff valves between the $[n-1]^{th}$ valve and the highest pressure bleed port (i.e., the $[n-2]^{th}$, $[n-3]^{th}$ ... 1st) are held open to create a negative pressure differential across the nonselected check valves (i.e., the $[n-2]^{th}$, $[n-3]^{th}$ ... 1st).

More particularly, referring to FIG. 2, where the $n^{th}$ bleed port 240 in compressor 200 is selected, the $n^{th}$ controllable shutoff valve 215 is opened, the $[n-1]^{th}$ controllable shutoff valve 213 is closed and the controllable shutoff valves 204, 208 and 214 between $[n-1]^{th}$ valve 213 and bleed port 210 are opened. A positive pressure differential is created across the $[n-1]^{th}$ check valve 244, opening that valve and allowing pressurized air to flow from the $n^{th}$ bleed port 240 to bleed air system output connector 218. Additionally, this arrangement creates a negative pressure differential across check valves 224 and 234, forcing them closed and eliminating flapping since the pressure from bleed port 210 exceeds the pressure from bleed ports 220 and 230.

In an alternate embodiment, the controllable shutoff valves may be adapted to allow pressurized air to leak through or across those valves, even when they are closed. Although the leakage would be minimal, it would be sufficient to provide a negative pressure on the downstream check valves forcing them to close and prevent fluttering. The check valve for the selected bleed port would not be forced closed since, due to the flow of air through the fully open controllable shutoff valve, the pressure drop across the "leaking" controllable shutoff valves would be sufficient to ensure that the pressure differential across the check valve for the "selected" bleed port would remain positive and the check valve would remain open. Leakage by-pass means according to the present invention could include a small unobstructed pipe around the valve, a hole in the valve or a mechanism which prevents the valve from closing completely.

It will also be recognized that the upstream controllable shutoff valves may be opened enough to provide the back pressure necessary to prevent flapping of the downstream check valves for nonselected bleed ports. In this case, the last downstream shutoff valve before the selected bleed port could be closed completely in order to prevent higher pressure air from escaping.

More particularly, in the embodiment of FIG. 1, if bleed port 130 was selected, controllable shutoff valve 114 would be open and controllable shutoff valve 104 and 108 would be closed. "Flapping" in check valve 124 could be prevented by allowing a limited amount of air to pass through controllable shutoff valve 104, either by manufacturing it with a small bypass tube or by holding it open slightly or by incorporating a hole in the valve to allow air to pass into bleed pipe 106. Since controllable shutoff valve 108 will effectively prevent the passage of pressurized air, the air pressure at the output 124b of check valve 124 will exceed the air pressure at the input 124a, creating a negative pressure differential across the valve and forcing it closed. Even if controllable shutoff valve 108 includes a bypass tube, the pressure drop across that valve resulting from the air flowing through controllable shutoff valve 114 will be substantially equal to the pressure differential between the air pressure at bleed port 110 and the air pressure at bleed port 130. Therefore, even with the bypass losses, the pressure in bleed tube 106 will be high enough to create a negative pressure differential across check valve 124 and force it to close.

A further advantage of the present invention is the series arrangement of the controllable shutoff valves which adds redundancy in case of failure.

In addition, it is not necessary to derive position feedback from the upstream controllable shutoff valves, since, in an arrangement according to the present invention, accurate information may be obtained by placing a pressure transducer and temperature sensor just before the last controllable shutoff valve preceding the bleed air system output connector. For example, a suitable pressure transducer 150 and temperature sensor 160 could be located in bleed tube 112 just before controllable shutoff valve 114 in FIG. 1. In FIG. 2, pressure transducer 250 and temperature sensor 260 could be located just before controllable shutoff valve 215. Placing a pressure transducer and a temperature sensor in that position eliminates the necessity of providing position feedback information from controllable shutoff valves 104 and 108. Since the engine control can include information, including software models and/or temperature transducers and pressure sensors to measure or predict the pressures and temperatures in the relevant compressor stages, the position of controllable shutoff valves 104 and 108 may be established by comparing the information from the models and/or sensors with the information measured in bleed tube 112.

It will be recognized that controllable modulating valves may be substituted for the controllable shutoff valves in the present invention to control the valve position across its full range. For the purposes of the present invention, a shutoff valve is any controllable valve having at least two positions corresponding to two different flows through the valve. For the purposes of the present invention, a modulating valve will include any valve capable of continuous operation over the full range of open to closed and any valve operable over any portion of that range. A fuel modulated valve would comprise a modulating valve actuated directly by fuel. The fuel signal may, for example, be controlled by electrical signals from the ECU. Further, the modulating valve could be, for example, a fuel controlled valve. It will also be noted that the actual air pressure at the bleed air system output connector may be reduced (and thus controlled) directly by controlling the final controllable shutoff valve to limit the flow of air to the bleed air system output connector. For example, in FIG. 1, controllable shutoff valve 114 may be positioned to limit total flow (and thus the air pressure) to bleed air system output connector 118.

Final controllable shutoff valve 114 may advantageously be a fuel controlled valve which provides advantages in reliability and control accuracy. It may also be advantageous to use fuel controlled valves as controllable shutoff valves 104 and/or 106 if modulation is required.

The Electronic Control Unit (ECU) can also position the final controllable shutoff valve as required to reduce bleed air flow in order to protect against an over temperature event as indicated by a temperature sensor at the firewall between the engine and aircraft or as predicted by a model of the BASS system air flows in the ECU software. Additionally, in a reverse flow situation, (i.e., where air is flowing into the BASS system) the ECU can close any of the controllable shutoff valves.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What I claim is:

1. A bleed air system arrangement for a compressor including a number of bleed ports, a plurality of controllable valves and a plurality of check valves, each of said controllable and check valves having an input and an output, said bleed air system comprising:
   a first bleed pipe connecting a first bleed port in said compressor to an input of a first controllable valve;
   an output of said first controllable valve being connected to an input of a second controllable valve by a second bleed pipe;
   an output of said second controllable valve being connected to an input of a third controllable valve by a third bleed pipe;
   a fourth bleed pipe connecting a second bleed port to an input of a first check valve;
   an output of said first check valve being connected to said second bleed pipe by a fifth bleed pipe;
   a sixth bleed pipe being connecting a third bleed port to an input of a second check valve; and
   an output of said second check valve being connected to said third bleed pipe by a seventh bleed pipe.

2. A bleed air system according to claim 1, wherein:
   each of said bleed ports is adapted to bleed air from a particular stage of said compressor;
   air bled from said first bleed port is at a higher pressure than air bled from said second port; and
   air bled from said second port is at a higher pressure than air bled from said third port.

3. A bleed air system according to claim 1 further including:
   a pressure sensor adapted to measure the pressure at said input to said third controllable valve.

4. A bleed air system according to claim 1, further including:
   a temperature sensor adapted to measure the temperature at said input to said controllable valve.

5. A bleed air system according to claim 1 wherein:
   said third controllable valve is fuel modulated.

6. A bleed air system according to claim 5 wherein:
   said first and second controllable valves are fuel modulated.

7. A bleed air system according to claim 1 wherein:
   said third controllable valve is a modulating valve.

8. Bleed air system according to claim 7 wherein:
   said first and second controllable valves are modulating valves.

9. Bleed air system according to claim 1 wherein:
   said first and second controllable valves include a leakage bypass means.

10. A bleed air system having an output and a plurality of inputs attached to first, second and third high pressure bleed ports on a compressor, comprising first, second and third controllable valves and first and second check valves, wherein:
    said first bleed port is connected to said output through said first, second and third controllable valves;
    said second bleed port is connected intermediate said first and second controllable valves through said first check valve; and
    said third bleed point is connected intermediate said second and third controllable valves through said second check valve.

11. A bleed air system according to claim 10 wherein:
    air from said first bleed point is higher in pressure than air from said second bleed port; and
    air from said second bleed port is higher in pressure than air from said third bleed port.

12. A bleed air system according to claim 10 wherein:
    said system includes a pressure sensor means located at an input to said third shutoff valve.

13. A bleed air system according to claim 12 wherein:
    said system includes a temperature sensor at an input to said third stage shutoff valve.

14. A bleed air system according to claim 10 wherein said third controllable valve is a modulating valve.

15. A bleed air system according to claim 14 wherein said first and second controllable valves are modulating valves.

16. A bleed air system according to claim 10 wherein:
    said first and second controllable valves include leakage bypass means.

* * * * *